United States Patent
Goretzki et al.

(10) Patent No.: US 10,876,612 B2
(45) Date of Patent: Dec. 29, 2020

(54) METHOD FOR OPERATING A DRIVE TRAIN FOR DRIVING A WORKING MACHINE WITH VARIABLE ROTATION SPEED AND DRIVE TRAIN

(71) Applicant: VOITH PATENT GMBH, Heidenheim (DE)

(72) Inventors: Peter Goretzki, Wallhausen (DE); Hartmut Graf, Urbach (DE); Thomas Taeuber, Crailsheim (DE)

(73) Assignee: Voith Patent GmbH, Heidenheim (DE)

( * ) Notice: Subject to any disclaimer, the term of this patent is extended or adjusted under 35 U.S.C. 154(b) by 0 days.

(21) Appl. No.: 16/474,579

(22) PCT Filed: Jan. 9, 2018

(86) PCT No.: PCT/EP2018/050387
§ 371 (c)(1),
(2) Date: Jun. 28, 2019

(87) PCT Pub. No.: WO2018/137916
PCT Pub. Date: Aug. 2, 2018

(65) Prior Publication Data
US 2019/0346031 A1 Nov. 14, 2019

(30) Foreign Application Priority Data
Jan. 25, 2017 (DE) ........................ 10 2017 101 339

(51) Int. Cl.
*F16H 47/08* (2006.01)
*F16H 3/72* (2006.01)
(Continued)

(52) U.S. Cl.
CPC ............... *F16H 47/08* (2013.01); *F16H 3/72* (2013.01); *F16H 61/56* (2013.01); *F16H 61/64* (2013.01);
(Continued)

(58) Field of Classification Search
USPC .......................................................... 477/67
See application file for complete search history.

(56) References Cited

U.S. PATENT DOCUMENTS 3,277,744 A 10/1966 Stockton
3,960,028 A 6/1976 Martin
(Continued)

FOREIGN PATENT DOCUMENTS

DE 7404122 U 3/1976
DE 10343871 A1 4/2005
(Continued)

OTHER PUBLICATIONS

List, H.:"Das Getriebebuch-Der Fahrzeugantrieb", Wien, Springer, 2012, p. 195, ISBN: 978-3-7091-0876-5.
(Continued)

*Primary Examiner* — Dirk Wright
(74) *Attorney, Agent, or Firm* — Laurence A. Greenberg; Werner H. Stemer; Ralph E. Locher

(57) ABSTRACT

A method operates a drive train for driving a working machine with variable rotation speed. The method includes running up the electric drive machine from a standstill with evacuated hydrodynamic rotation speed/torque converter to a predefined value which indirectly characterizes the operating mode of the drive machine. Simultaneously with reaching the predefined value which indirectly characterizes the operating mode of the drive machine or with a temporal offset after reaching this, filling the hydrodynamic rotation speed/torque converter and driving the turbine vane wheel. Thereafter, the third element of the planetary gear mechanism is driven with a rotation speed which results from a superposition, defined by the planetary gear mechanism, of the rotation speed of the first element of the planetary gear mechanism connected to the electric drive machine and the rotation speed of the second element of the planetary gear (Continued)

mechanism which is indirectly connected to the turbine wheel.

27 Claims, 6 Drawing Sheets

(51) Int. Cl.
  *F16H 61/56* (2006.01)
  *F16H 61/64* (2006.01)
  *H02K 7/00* (2006.01)
  *H02K 7/10* (2006.01)
  *H02K 7/116* (2006.01)
  *H02K 7/118* (2006.01)

(52) U.S. Cl.
  CPC .............. *H02K 7/006* (2013.01); *H02K 7/10* (2013.01); *H02K 7/116* (2013.01); *H02K 7/118* (2013.01); *F16H 2200/20* (2013.01)

(56) References Cited

U.S. PATENT DOCUMENTS

| | | | | |
|---|---|---|---|---|
| 4,726,255 | A * | 2/1988 | Humpfer | F16H 47/085 475/34 |
| 6,838,778 | B1 * | 1/2005 | Kandil | F02C 7/268 290/27 |
| 7,100,370 | B2 * | 9/2006 | Klement | B60W 10/02 60/357 |
| 7,105,937 | B2 * | 9/2006 | Hoppe | F02C 7/268 290/38 R |
| 7,559,813 | B2 * | 7/2009 | Basteck | F16H 47/08 440/6 |
| 8,663,047 | B2 * | 3/2014 | Schroth | F16H 47/085 475/59 |
| 9,166,456 | B2 * | 10/2015 | Melfi | H02K 7/10 |
| 9,377,094 | B2 * | 6/2016 | Borntrager | B60T 1/087 |
| 9,453,567 | B2 * | 9/2016 | Graf | F16H 47/085 |
| 10,113,626 | B2 * | 10/2018 | Kernchen | F16H 47/085 |
| 2020/0124153 | A1 * | 4/2020 | Graf | F16H 47/085 |

FOREIGN PATENT DOCUMENTS

| | | |
|---|---|---|
| DE | 102008034607 A1 | 1/2010 |
| EP | 2161416 B1 | 9/2014 |
| GB | 847742 A | 9/1960 |
| GB | 994256 A | 6/1965 |
| WO | 2015071349 A2 | 5/2015 |

OTHER PUBLICATIONS

Voith: "Pumpen und Kompressoren effizient regeln. Regelbares Planetengetriebe Vorecon", [Efficient Control of Pumps and Comperssors. Vorecon Variable Speed Planetary Gear] ,Crailsheim, 2013 (cr168de), 40 pages, English Version.

* cited by examiner

METHOD FOR OPERATING A DRIVE TRAIN FOR DRIVING A WORKING MACHINE WITH VARIABLE ROTATION SPEED AND DRIVE TRAIN

BACKGROUND OF THE INVENTION

Field of the Invention

The invention concerns a method for operating a drive train for driving a working machine with variable rotation speed. The invention furthermore concerns the design of a drive train.

Drive trains with a drive machine which can be operated at constant rotation speed and a power transmission device coupled thereto for driving a working machine with variable rotation speed are known from the prior art in various designs. For example, reference is made to Voith publication cr168de "Efficient control of pumps and compressors"; April. 2013 and WO2015071349A1.

Such a drive train comprises at least a drive machine and a power transmission device with an input connected at least indirectly to the drive machine, an output which is or can be connected at least indirectly to the working machine, a hydrodynamic rotation speed/torque converter with at least a pump vane wheel, a turbine vane wheel and a guide wheel which form a working chamber that can be filled with operating medium, wherein at least one of the vane wheels comprises adjustable vanes or adjustable vane segments, and a superposition gear mechanism. The superposition gear mechanism comprises at least one planetary gear mechanism with a ring gear, a sun wheel and a planet carrier with several planet wheels, as elements of the planetary gear mechanism. The input of the power transmission device is connected at least indirectly, preferably directly, to the pump wheel of the hydrodynamic converter and to a first element of the planetary gear mechanism. The turbine wheel of the hydrodynamic converter is connected at least indirectly, preferably directly, to a second element of the planetary gear mechanism, and a third element of the planetary gear mechanism is connected at least indirectly to or forms the output. The power is thereby transmitted in a power branch via a hydrodynamic and a mechanical power branch, wherein the power proportions are cumulated in the planetary gear mechanism. An operating medium supply and/or conduction system is assigned at least to the converter, preferably to the power transmission device, and a device is provided for filling and/or evacuating the converter. The converter is filled during operation. To control the transmission behavior of the converter, the latter is formed as an adjustable converter with adjustable vanes on the guide wheel.

If an electric drive machine is used as a drive machine, this means that on direct coupling to the power transmission device on start-up, it is immediately loaded with the load present at the output due to the coupling of the working machine. Since in particular such drive concepts are used to drive working machines with high power demand, start-up takes place under very high load due to the inertia of the working machine. This entails firstly very high necessary switch-on currents of the electric drive machine which result in great network fluctuations. To avoid this disadvantage therefore, a hydrodynamic coupling is arranged upstream of the converter which takes over the power transmission between the input and output of the power transmission device during start-up of the drive machine. This however takes up additional installation space and must be integrated in the design and control system of the power transmission device. As well as increased complexity of design and control system, such a solution is thus characterized by an increase in the number of components to be maintained and higher investment costs.

SUMMARY OF THE INVENTION

The invention is therefore based on the object of refining a drive train for driving a working machine with variable rotation speed, and a method for its operation, so as to avoid said disadvantages. In particular, with a power transmission device configured as compactly as possible, where possible with the omission of a hydrodynamic clutch, the requirements of a variable-speed drive of working machines of high performance class can be fulfilled and a gentle start-up of the electric drive machine ensured while avoiding temporary network overloads.

The solution according to the invention is described by the features of the independent method claim. The implementation by the device is given in the independent drive train claim. Advantageous embodiments are described in the subclaims.

A method according to the invention for operating a drive train for driving a working machine with variable rotation speed, with an electric drive machine which can be operated at constant rotation speed and a power transmission device, wherein the power transmission device comprises at least:
- an input for at least indirect connection to the drive machine;
- an output for at least indirect connection to the working machine;
- a hydrodynamic rotation speed/torque converter with at least a pump vane wheel, a turbine vane wheel and a guide wheel which form a working chamber that can be filled with operating medium;
- a superposition gear mechanism with at least one planetary gear mechanism comprising a ring gear, a sun wheel and a planet carrier with several planet wheels as elements of the planetary gear mechanism, wherein
  the input of the power transmission device is connected at least indirectly, preferably directly, to the pump wheel of the hydrodynamic rotation speed/torque converter and to a first element of the planetary gear mechanism, the turbine wheel of the hydrodynamic rotation speed/torque converter is connected at least indirectly to a second element of the planetary gear mechanism, and a third element of the planetary gear mechanism is connected at least indirectly to or forms the output of the power transmission device;
- with an operating medium supply and/or guidance system assigned at least to the hydrodynamic rotation speed/torque converter, and a device for influencing the filling state of the hydrodynamic rotation speed/torque converter;

comprises the following steps:
- running up the electric drive machine from a standstill with evacuated hydrodynamic rotation speed/torque converter to a predefined value which at least indirectly characterizes the operating mode of the drive machine, in particular its rotation speed,
- simultaneously with reaching the predefined value which at least indirectly characterizes the operating mode of the drive machine, in particular its rotation speed, or with a temporal offset after reaching this, filling the hydrodynamic rotation speed/torque converter and driving the turbine wheel,
- driving the third element of the planetary gear mechanism with a rotation speed which results from a superposition, defined by the planetary gear mechanism, of the rotation speed of the first element of the planetary gear mechanism connected to the electric drive machine and the rotation speed of the second element of the planetary gear mechanism which is at least indirectly connected to the turbine wheel.

These method steps describe the basic steps of the method. In an advantageous refinement, these can be supplemented or modified by further method steps either upstream or downstream, or by intermediate steps.

The term "running up" of a drive machine, in particular a drive machine operated with constant rotation speed, describes the process from start-up (the time of switch on/connection or starting of the start-up process before connection to the power network) until reaching of a predefined value at least indirectly characterizing the operating mode of the drive machine. This value is preferably the nominal rotation speed of the electric drive machine.

The phrase "at least indirectly connected" includes possibilities for direct coupling/connection, or also indirect connection with the interposition of torque-transmitting components, which may include also rotation speed/torque conversion devices.

A "value at least indirectly characterizing the operating mode" is a physical value which characterizes a status or process. The value may directly constitute the status or process variable at the respective function element, for example the rotation speed of the drive machine. It is also conceivable to describe this status or process variable indirectly through other values. In this case, there is a correlation which can be depicted via functions or relationships.

The method according to the invention offers the advantage that in general, there is no need for a space-consuming additional hydrodynamic clutch, but nonetheless a gentle run-up of the drive machine is guaranteed. This is achieved in particular in that during start-up of the drive machine, by decoupling the hydrodynamic power branch implemented by the hydrodynamic rotation speed/torque converter, the drive machine need only drive the first element of the planetary gear mechanism, which is coupled at least indirectly thereto via the input of the power transmission device, and overcome its inertia (and the friction moments of the output shaft). The drive machine need not therefore work against the full load moment of the working machine and the mass inertias of the entire power transmission device, and can be run up. The third element of the planetary gear mechanism connected at least indirectly to the working machine via the output of the power transmission device is supported via the connection on the working machine, and remains stationary because of its greater mass. Because of the rotation speed difference between the first and third elements of the planetary gear mechanism, and the coupling of the second element of the planetary gear mechanism to the turbine wheel, a resulting rotation speed is set at the turbine wheel. This furthermore offers the advantage that on filling of the converter after start-up of the drive machine, there is no need to firstly overcome the inertia of the turbine wheel, and the third element forming or connected to the output is driven and the output is accelerated. This method can thus be achieved with little structural complexity and allows the provision of highly compact power transmission devices which, in particular, are short in the axial direction and have a low number of functional parts. Accordingly only an operating medium supply and/or guidance system for the hydrodynamic rotation speed/torque converter need be provided in the device, together with corresponding devices for setting the filling state of the converter, in particular filling and/or evacuation devices, and furthermore a control device which is coupled to detection devices for detecting actual values of status or process variables of the hydrodynamic rotation speed/torque converter and drive machine and for any required actuation of a device for influencing the filling state of the hydrodynamic rotation speed/torque converter.

After the setting of a predefined value at least indirectly characterizing the operating mode of the drive machine, in particular the setting of the nominal rotation speed of the drive machine, the hydrodynamic rotation speed/torque converter is filled. Filling is preferably controlled. This may take place simultaneously or with a temporal offset. Preferably however, the aim is to fill the converter temporally as closely as possible.

To set the transmission behavior of the hydrodynamic rotation speed/torque converter, in an advantageous refinement it is provided that at least one of the vane wheels of the hydrodynamic rotation speed/torque converter comprises adjustable vanes or adjustable vane segments, and the transmission behavior of the hydrodynamic rotation speed/torque converter, in particular the rotation speed of the turbine wheel, can be set by adjusting at least individual adjustable vanes or adjustable vane segments on at least one of the vane wheels—pump wheel, turbine wheel or guide wheel. This is achieved with the drive machine run up to speed and the converter filled, in order to guarantee acceleration of the third element of the planetary gear mechanism.

The method is particularly advantageous if an electric drive machine in the form of a synchronous or asynchronous motor is used as a drive machine. The procedure according to the invention here allows a great reduction in switch-on currents and thus prevents overload of the power network.

To reliably guarantee the presence of the "evacuated" state at the hydrodynamic rotation speed/torque converter, it is provided that this is always evacuated on the presence of at least one of the events listed below:
- on or after termination of the run-down/shut-down of the drive train,
  (This can preferably take place automatically on run-down, depending on arrangement of the outlet, in particular by the design or under control.)
- detection of a filling state before or on start-up after shut-down the drive train,
- detection of a filling state when a predefined nominal value is present for setting a predefined operating mode of the working machine on stoppage of the drive train.

The preferred additional test of the filling state reliably guarantees a start-up of the electric drive machine with an evacuated converter, which is advantageous in particular after lengthy stoppage periods, in particular if no automatic evacuation of the hydrodynamic rotation speed/torque converter is provided on shut-down of the drive train, or if the latter is provided but has malfunctioned.

In order in particular to avoid overloading the bearings of the turbine wheel by excessively high rotation speeds on start-up of the drive machine, at least two further fundamental extensions of the basic method are conceivable.

According to a first fundamental extension of the basic method according to the invention, it is provided that a drive moment is introduced on the output side, i.e. at least indirectly into the third element of the planetary gear mechanism. In a particularly advantageous embodiment, with the electric drive machine stopped and the hydrodynamic rotation speed/torque converter evacuated, the third element of the planetary gear mechanism is driven at least indirectly, preferably directly, via a first auxiliary drive device. Simultaneously with this or with a temporal offset from the setting of a predefined design rotation speed of the third element of the planetary gear mechanism, the electric drive machine is run up, and the first element of the planetary gear mechanism is driven directly by the electric drive machine while the hydrodynamic converter remains evacuated. The necessary rotation speed for which the auxiliary drive device must be designed results from the limitations of the turbine wheel (bearing, strength, deformation under centrifugal force) and the translation ratio of the planetary gear mechanism. The load moment of the working machine must be taken into account in the design of the auxiliary drive machine, which in particular may be configured as a rotor rotation device. The filling of the hydrodynamic rotation speed/torque converter at or after reaching the nominal rotation speed of the drive machine leads to a torque transmission via this, and causes a reversal of the force flow direction at the third element of the planetary gear mechanism via the drive of the turbine wheel and its coupling to the second element of the planetary gear mechanism. Therefore, on reversal of the force flow to the third element of the planetary gear mechanism by driving the second element of the planetary gear mechanism via the turbine wheel with the hydrodynamic rotation speed/torque converter filled, the first auxiliary drive device is deactivated. The third element of the planetary gear mechanism is then driven via the turbine wheel with the superposition rotation speed, defined by the planetary gear mechanism from the rotation speed of the first element of the planetary gear mechanism connected to the electric drive machine and the rotation speed of the second element of the planetary gear mechanism which is connected at least indirectly to the turbine wheel when the converter is filled. In order to avoid the first auxiliary drive device working counter to the planetary gear mechanism on hydrodynamic power transmission with the converter filled, the first auxiliary drive device is deactivated on drive of the third element of the planetary gear mechanism with the superposition rotation speed, defined by the planetary gear mechanism from the rotation speed of the first element of the planetary gear mechanism connected to the electric drive machine and the rotation speed of the second element of the planetary gear mechanism which is connected at least indirectly to the hydrodynamically driven turbine wheel.

The introduction of the drive moment and hence operation of the first auxiliary drive device can be controlled, in particular with regard to the time of connection and the amount of the drive moment and the achievable rotation speed. Furthermore, the introduction of the drive moment and its deactivation can take place in controlled fashion or automatically.

In a particularly advantageous embodiment of this first fundamental extension of the basic method according to the invention, to exclude contrary working of the first auxiliary drive device on combined mechanical and hydrodynamic power transmission, the drive moment is introduced into the third element of the planetary gear mechanism via a device, in particular a shaft rotation device, connected thereto via a freewheel system or a self-synchronizing shifting clutch, wherein the self-synchronizing shifting clutch is configured to decouple the first auxiliary drive device when the hydrodynamic rotation speed/torque converter is filled and on reversal of the force flow by the driving of the third element of the planetary gear mechanism via the turbine wheel. This offers the advantage of automatic deactivation on occurrence of the event, and avoids separate monitoring of the operating mode of the first auxiliary drive device with a view to its targeted deactivation.

Other designs for decoupling the first auxiliary drive device are also conceivable. Thus for example, switchable clutches may be provided in the connection between the third element of the planetary gear mechanism or an element connected thereto and the auxiliary drive device. Actuation for coupling and decoupling then takes place under control. Furthermore, when auxiliary drive devices in the form of rotor rotation devices with swiveling pinions are used, decoupling takes place by swiveling the pinion and disengaging this from the counter-pinion in the connection between the rotor rotation device and the third element of the planetary gear mechanism.

In order to run up the drive machine with minimum load and in defined fashion in this first fundamental extension of the basic method according to the invention, according to a particularly advantageous embodiment of this refinement, the run-up is additionally supported by an auxiliary start device. This auxiliary start device may be configured in various ways. The use of soft starters or frequency converters is conceivable, and also systems of auxiliary motors coupled to the drive machine, in which the coupling is not rigid but preferably takes place via a transmission unit which preferably allows a rotation speed/torque conversion.

The additional introduction of the drive moment into the third element of the planetary gear mechanism offers the advantage that, firstly, while the drive machine is not yet run up, the turbine rotation speed is limited because of the rotation speed difference between the first and third elements, and furthermore during motor start-up, defined operating states can be set at any time.

In a refinement according to the invention, the basic method is refined in a second fundamental extension by the following method steps:

with the electric drive machine stopped and the hydrodynamic rotation speed/torque converter evacuated, the third element of the planetary gear mechanism is driven at least indirectly, preferably directly, via a first auxiliary drive device.

This takes place in a similar fashion to the first fundamental extension.

Furthermore, simultaneously or with a temporal offset from the driving of the third element of the planetary gear mechanism, the first element of the planetary gear mechanism or the connection of the first element of the planetary gear mechanism and the electric drive machine (main drive machine) is driven at least indirectly, preferably directly, via a second auxiliary drive device. The electric drive machine is driven via the drive of the first element of the planetary gear mechanism, or the connection of the first element of the planetary gear mechanism and the electric drive machine, until the network and the electric drive machine are in synchrony, wherein in the synchronous state, the electric drive machine is connected to a network. In this case therefore, firstly a drive machine already brought to nominal rotation speed is connected to the network, whereby high switch-on currents during start-up under load are avoided completely.

The electric drive machine bears the load only after it has reached its stable working point.

The advantage lies in that, firstly, the drive machine can be brought into operation completely without load and driven up to nominal rotation speed at least indirectly via the second auxiliary drive device, and transmits power to the power transmission device only on synchronization. A separate auxiliary start device for the drive machine may therefore be omitted. Also, the necessary switch-on current for the electric drive machine can be kept low. Furthermore, the resulting turbine rotation speed with evacuated converter is limited by the rotation speeds of the first and third elements of the planetary gear mechanism, so that damage to its bearing caused thereby can be excluded.

Also the drive of the second auxiliary drive device—when no longer required—is deactivated on driving of the first element via the drive machine, or the second auxiliary drive device is decoupled from the first element of the planetary gear mechanism or from the connection of the first element of the planetary gear mechanism and the drive device.

In the second fundamental extension of the basic method, again, preferably first and/or second auxiliary drive devices are switched on and deactivated either under control, or coupling takes place such that at least automatic deactivation is possible. Particularly preferably, for this the individual auxiliary drive devices are coupled to the respective elements of the planetary gear mechanism via a self-synchronizing shifting clutch. With regard to the first auxiliary drive device, reference may be made to the statements on the introduction of the first drive moment into the third element of the planetary gear mechanism.

Automatic decoupling of the second auxiliary drive device, when the latter is coupled at least indirectly to the first element of the planetary gear mechanism, may take place via a self-synchronizing shifting clutch if this is designed and arranged so as to respond automatically on reversal of the power flow to the first element, in particular the introduction of a drive moment into the first element via the electric drive machine, and decouple the second auxiliary device therefrom.

The term "self-synchronizing shifting clutch" here in particular means a clutch for coupling together two parts, wherein the connection is released automatically on a reversal of the rotation direction or if the rotation speed of the part to be actually driven is higher than that of the driving part.

Other embodiments for decoupling the second auxiliary drive device are also conceivable. Devices for optional coupling or decoupling of the second auxiliary drive device from the first element of the planetary gear mechanism or an element at least indirectly connected thereto, or devices for optional coupling or decoupling of the second auxiliary drive device from the connection between the first element of the planetary gear mechanism and the drive machine, may be used. Switchable clutches which are operated in controlled fashion may function as such devices. Furthermore, when auxiliary drive devices in the form of rotor rotation devices with swiveling pinions are used, decoupling may take place by swiveling the pinion and bringing this out of engagement with the counter-pinion. The counter-pinion may in particular be arranged in the connection between the first element of the planetary gear mechanism and the drive machine, or in an element connected in rotationally fixed fashion to the first element.

In all above-mentioned method steps, the drive machine is mechanically connected to the first element of the planetary gear mechanism for performance of the method.

The basic method according to the invention of starting with an evacuated hydrodynamic rotation speed/torque converter may be used in various configurations of power transmission devices with converter and downstream superposition gear mechanism. The basic configuration as described in the independent drive train claim. It is decisive for implementation to provide a control device which is coupled communicatively at least to the following function components.

detection devices for detecting at least one of the following variables:
a variable at least indirectly describing an actual value of the operating mode of the working machine,
a variable at least indirectly describing an actual value of the filling state of the hydrodynamic rotation speed/torque converter;
and actuation devices for operating the devices for influencing the filling state of the hydrodynamic rotation speed/torque converter.

With regard to the advantages, in order to avoid repetition, reference is made to the statements relating to the method. This also applies for the advantageous embodiments indicated below which are necessary to implement the first extension and the second extension of the method.

The adjustment of at least individual adjustable vanes and/or adjustable vane segments on the individual vane wheels—pump wheel and/or turbine wheel or guide wheel—offers the advantage of controllability of the power capacity and an extension of the possible operating range of the converter within the power transmission device.

In a particularly advantageous basic design of the power transmission device, the converter is configured as a reverse rotation converter. Various possibilities for coupling to the planetary gear mechanism exist. In a particularly advantageous structural design, the first element of the planetary gear mechanism is formed by the planet carrier, the second element of the planetary gear mechanism by the sun wheel, and the third element of the planetary gear mechanism by the ring gear of the planetary gear mechanism. The use of a reverse rotation converter, because of its structural design, allows very simple and compact construction of the power transmission device itself and the structural integration of the actuation device. The design in which the ring gear is connected to the output shaft directly or via a further gear mechanism, preferably a spur gear, and in which the hydrodynamic power branch is established via the sun wheel, has the decisive advantage that because of the favorable rotation speeds, the planetary gear mechanism may be designed very compactly. The device as a whole thus has a very compact structure in which no coupling sleeve is required. Also, no additional stationary transmission is required in the form of planetary gear mechanisms, and the device may therefore be designed to be very small and compact with a low number of components, and accordingly be produced and installed simply and economically. In an advantageous refinement, the structure may be configured with precisely one planetary gear mechanism, so that no further, comparatively costly planetary gear mechanisms are required.

According to an advantageous refinement, it is furthermore provided that the turbine of the hydrodynamic reverse rotation converter is connected to the sun wheel of the planetary gear mechanism via a hollow shaft, and the input shaft running through the hollow shaft is connected to the planet carrier on the side of the planetary gear mechanism facing away from the hydrodynamic reverse rotation converter. This allows a very compact structure which can be implemented in a very space-saving fashion. According to this design, the hollow shaft has a comparatively small diameter and is far less complex and costly than for example the coupling sleeve in the design according to the prior art.

In an alternative basic design, the hydrodynamic rotation speed/torque converter is configured as a synchronous rotation converter. In this case, the pump wheel and turbine wheel rotate in the same direction.

The following possibilities for coupling to the planetary gear mechanism result from the allocation of the individual components:
a) The first element of the planetary gear mechanism is formed by the ring gear, the second element of the planetary gear mechanism by the planet carrier, and the third element of the planetary gear mechanism by the sun wheel. The turbine wheel is connected to the planet carrier either directly or via a reversing gear mechanism.
b) The first element of the planetary gear mechanism is formed by the ring gear, the second element of the planetary gear mechanism by the sun wheel, and the third element of the planetary gear mechanism by the planet carrier.
c) The first element of the planetary gear mechanism is formed by the sun wheel, the second element of the planetary gear mechanism by the ring gear, and the third element of the planetary gear mechanism by the planet carrier.
d) The first element of the planetary gear mechanism is formed by the sun wheel, the second element of the planetary gear mechanism by the planet carrier, and the third element of the planetary gear mechanism by the ring gear.
e) The first element of the planetary gear mechanism is formed by the planet carrier, the second element of the planetary gear mechanism by the ring gear, and the third element of the planetary gear mechanism by the sun wheel.
f) The first element of the planetary gear mechanism is formed by the planet carrier, the second element of the planetary gear mechanism by the sun wheel, and the third element of the planetary gear mechanism by the ring gear.

To achieve the first modification of the basic method, a first auxiliary drive device is provided for at least indirectly introducing a drive moment into the third element of the planetary gear mechanism. The first auxiliary drive device is arranged and configured such that the drive moment is supplied to the third element of the planetary gear mechanism according to at least one of the following possibilities:
   introduction of the drive moment directly into the third element of the planetary gear mechanism,
   introduction of the drive moment into the connection between the third element of the planetary gear mechanism and the output of the power transmission device,
   introduction of the drive moment at the output of the power transmission device,
   introduction of the drive moment into the connection between the output of the power transmission device and the working machine,
   introduction of the drive moment into a rotation speed/torque conversion device connected to the third element, or to the connection between the third element of the planetary gear mechanism and the output, or to the connection between the output and the working machine.

If, in a configuration of the power transmission device, a step-up or step-down gear is arranged downstream of the planetary gear mechanism in the force flow between this and the working machine, wherein the output of the step-up or step-down gear is arranged eccentrically relative to the planetary gear mechanism, the first auxiliary drive device is preferably arranged at the free shaft end of the step-up or step-down gear which is provided in any case and faces away from the planetary gear mechanism.

Also, the auxiliary drive device provided for the second extension of the method for at least indirectly introducing a drive moment into the first element of the planetary gear mechanism, is preferably arranged and configured such that the drive moment is supplied to the first element planetary gear mechanism according to at least one of the following possibilities:
   introduction of the drive moment directly into the first element of the planetary gear mechanism,
   introduction of the drive moment into the connection between the first element of the planetary gear mechanism and the input of the power transmission device.

With regard to the design of the first and/or second auxiliary drive device, there are multiple possibilities. In the simplest case, these devices are formed by so-called shaft or rotor rotation devices. These are usually devices configured to rotate large masses and are operated electrically, mechanically, hydraulically or in a combination thereof. For this, standardized designs may be used. Alternatively, the use of drive motors is possible.

For the desired application, particularly advantageously, a rotor rotation device is suitable which consists of a self-synchronizing shifting clutch, bevel gear mechanism and electric motor which is speed-controlled (optionally) by means of frequency converters and mounted on the ring gear shaft.

Alternatively, the use of a rotor rotation device with a swiveling pinion is possible.

Auxiliary drive devices may furthermore be electric machines, hydrostatic drives or electrohydraulic assemblies.

Depending on the arrangement of the individual auxiliary drive devices in the drive train, it may be sufficient merely to deactivate these, or a reliable decoupling on the occurrence of predefined events is conceivable. In a particularly advantageous embodiment, the first and/or second auxiliary drive device can be decoupled from the drive train, preferably mechanically. This decoupling facility may, in a particularly advantageous refinement, be achieved by the coupling to the drive train via a self-synchronizing shifting clutch. This causes an automatic decoupling at a predefined rotation speed or on a change of rotation direction or reversal of power flow.

In a refinement, auxiliary start device is assigned to the electric drive machine for run-up, in order to guarantee as load-free a start as possible. For this, conventional soft starters may be used, furthermore separate auxiliary motors.

BRIEF DESCRIPTION OF THE SEVERAL VIEWS OF THE DRAWING

The solution according to the invention is explained below with reference to figures. The drawings depict individually.

DESCRIPTION OF THE INVENTION

Figure 1:
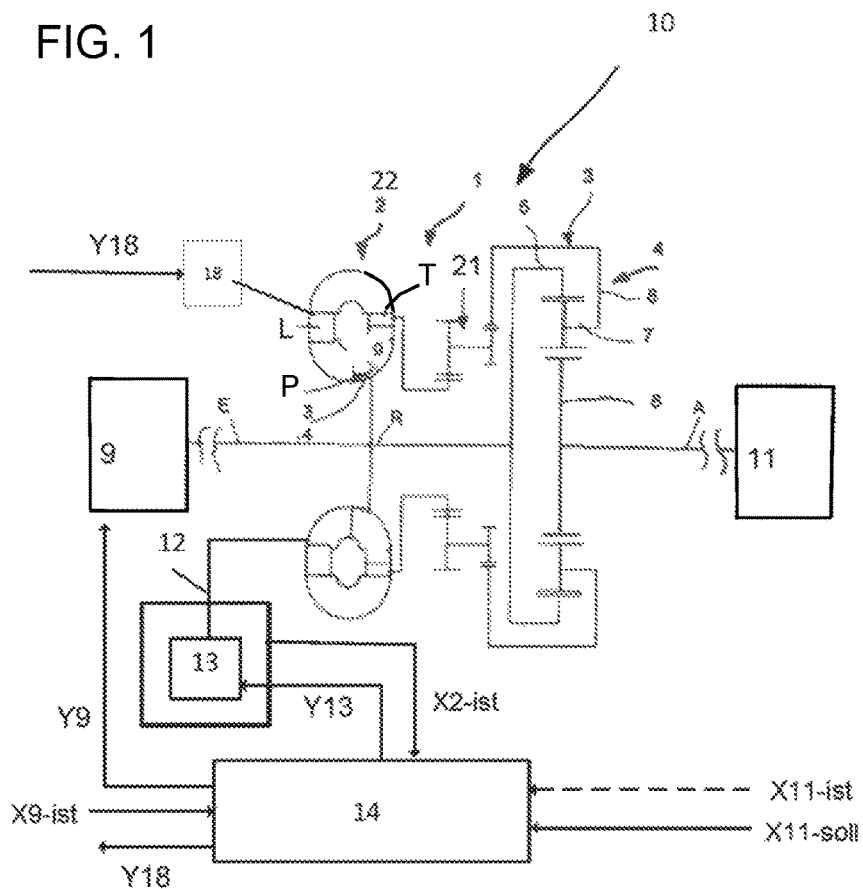
FIG. 1 as an example, the basic structure of a drive train for performance of the method according to the invention, with a power transmission device according to a first basic design.
Figure 2:
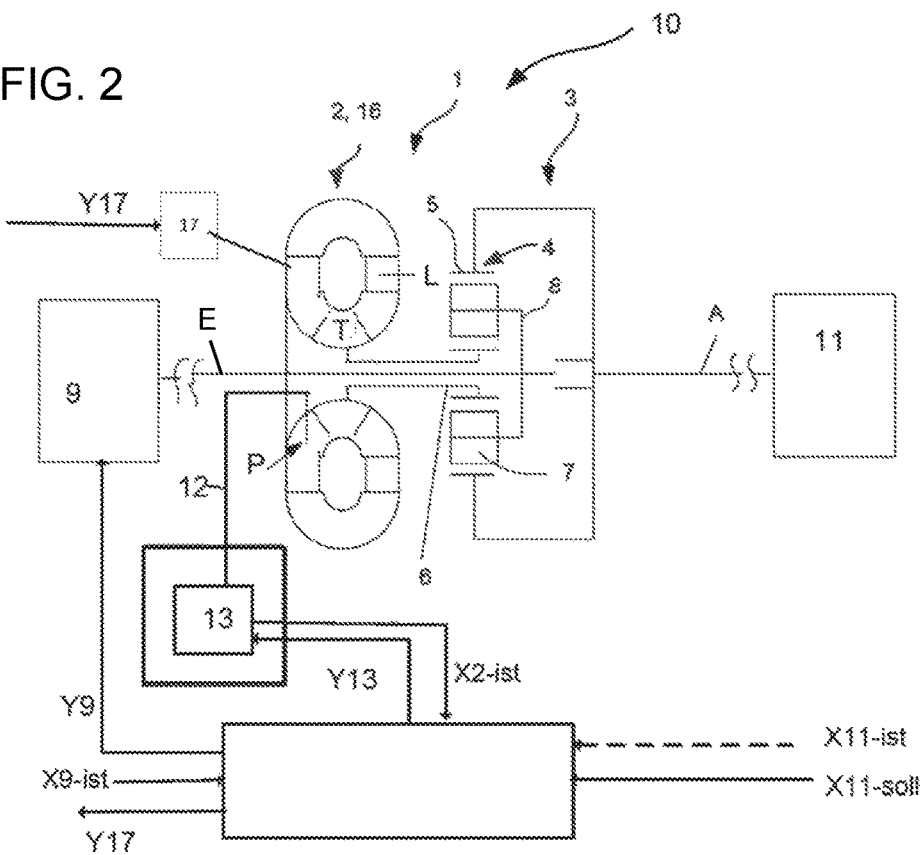
FIG. 2 as an example, the basic structure of a drive train for performance of the method according to the invention, with a power transmission device according to a second, particularly advantageous basic design.

FIGS. 1 and 2 illustrate, in a diagrammatic simplified depiction, the basic structure of two drive trains 10 designed according to the invention for driving a working machine 11. The drive train 10 comprises at least one electric drive machine 9, in particular in the form of an electric motor, and a power transmission device 1 according to two basic designs, in which the method according to the invention is used for starting the drive machine 9 or operating the drive train 10. The power transmission device 1 is arranged in the force flow between the drive machine 9 and the working machine 11. The arrangement is preferably coaxial. Eccentric arrangements are also possible with corresponding design of the connections between the individual function components. FIGS. 1 and 2 show exemplary basic designs which may be modified with regard to the coupling between the individual components and by the inclusion of further additional assemblies.

In both basic designs, the power transmission device 1 comprises at least one input E connected at least indirectly to the drive machine 9, and an output A which is or may be connected at least indirectly to the working machine 11, a hydrodynamic rotation speed/torque converter, referred to in brief below as a hydrodynamic converter 2, and a superposition gear mechanism 3 comprising at least one planetary gear mechanism 4. The input and output E, A are preferably configured as input and output shafts. A design in the form of torque-transmitting function components is also possible. The phrase "is or can be connected at least indirectly" here means connected either directly or via further interposed components, which may also include devices for rotation speed/torque conversion.

The superposition gear mechanism 3 comprises at least one—in the embodiment depicted precisely one—planetary gear mechanism 4 with at least one ring gear 5, a sun wheel 6, and a web 8 carrying the planet carrier 7, as elements of the planetary gear mechanism 4. The planet wheels 7 are mounted rotatably on the web 8.

The hydrodynamic converter 2 comprises at least a pump wheel P, a turbine wheel T and a guide wheel L. Both basic designs are characterized in that the input E is connected at least indirectly, preferably directly, to the pump wheel P and to a first element of the planetary gear mechanism 4; the turbine wheel T is connected at least indirectly, preferably directly, to a second element of the planetary gear mechanism 4; and output A is connected at least indirectly, preferably directly, to a third element of the planetary gear mechanism 4.

According to a first basic design—as depicted in exemplary fashion in FIG. 1, the converter 2 is designed as a synchronous rotation converter 22, in particular a monophase synchronous rotation converter. The pump wheel P and the turbine wheel T rotate in the same direction. Single-stage and multistage designs are also conceivable. In a multistage design, individual main members of the converter 2, formed by the pump wheel P or turbine wheel T, may consist of several vane rings, between which a main member or a vane ring of another main member is arranged.

In the embodiment shown in FIG. 1, the pump wheel P is at least indirectly coupled in rotationally fixed fashion to the first element of the planetary gear mechanism 4 in the form of the ring gear 5. The coupling here is direct. Furthermore, the input E is connected in rotationally fixed fashion to the pump wheel P and the ring gear 5. Preferably, the ring gear 5 and pump wheel P are coupled to a shaft forming the input E. The turbine wheel T is at least indirectly connected to the web 8. Here, connection takes place via a reversing stage 21, in particular an intermediate gear wheel. The hydrodynamic converter 2 and planetary gear mechanism 4 are arranged coaxially to each other relative to a rotation axis R. The output A is connected to the sun wheel 6. This may for example be formed directly by a shaft connected to or formed integrally with the sun wheel 6. However, the interposition (not shown here) of further rotation speed/torque conversion devices is also possible, wherein the output may then be arranged coaxially or eccentrically to the input E.

FIG. 2 illustrates a second basic design of a power transmission device 1 configured according to the invention, in which the converter 2 is designed as a reverse rotation converter 16, and which is particularly suitable for the method according to the invention. Said device also comprises, in addition to the converter 2, a superposition gear mechanism 3 comprising at least one planetary gear mechanism 4, here precisely one planetary gear mechanism 4. The hydrodynamic converter 2 and superposition gear mechanism 3 are here again arranged between the input E, in particular the input shaft which is connected at least indirectly and preferably directly to the drive machine 9, and an output A, in particular an output shaft which is connected at least indirectly and preferably directly to the working machine 11. In analogy to the design of FIG. 1, the planetary gear mechanism 4 comprises at least a ring gear 5, a sun wheel 6, planet wheels 7 and a planet carrier or web 8 carrying these. The reverse rotation converter 16 is characterized in that the pump wheel P and the turbine wheel T run in opposite directions. The turbine wheel T may be arranged axially next to the pump wheel P. Designs with radial arrangement are also conceivable. Furthermore, the converter 2 comprises at least one guide wheel L. The guide wheel L is preferably stationary, but may however also be mounted in rotatable fashion or be supported via a freewheel device.

The connection to the planetary gear mechanism 4 is here designed such that the pump wheel P of the hydrodynamic converter 2 is coupled to the web 8 of the planetary gear mechanism 4 and to the input E, while the turbine wheel T is connected at least indirectly, preferably directly, to the sun wheel 6 of the planetary gear mechanism.

In both designs of converter 16 or 22, this may be configured with adjustable vanes or vane segments on at least one of the vane wheels—pump wheel P, turbine wheel T or guide wheel L—in order to influence and control the transmission behavior, in particular the power transmission behavior, and rotation speed. FIG. 1 shows as an example the guide wheel L with an actuator device 18 for adjustment of individual vanes or vane segments. FIG. 2 shows as an example a converter with a particularly advantageous pump vane setting. The actuator device is marked 17. The corresponding actuation signals Y18 and Y17 are output by the control device 14. It is understood that the possibilities shown for adjustment of the vane components are exemplary, and other vane wheels may be equipped with adjustable vanes.

In the design according to FIG. 2, furthermore, the input E or shaft forming this or coupled to this is guided through the connecting shaft, formed as a hollow shaft, between the turbine wheel T and the second element of the planetary gear mechanism 4, here the sun wheel 6.

Figure 3:
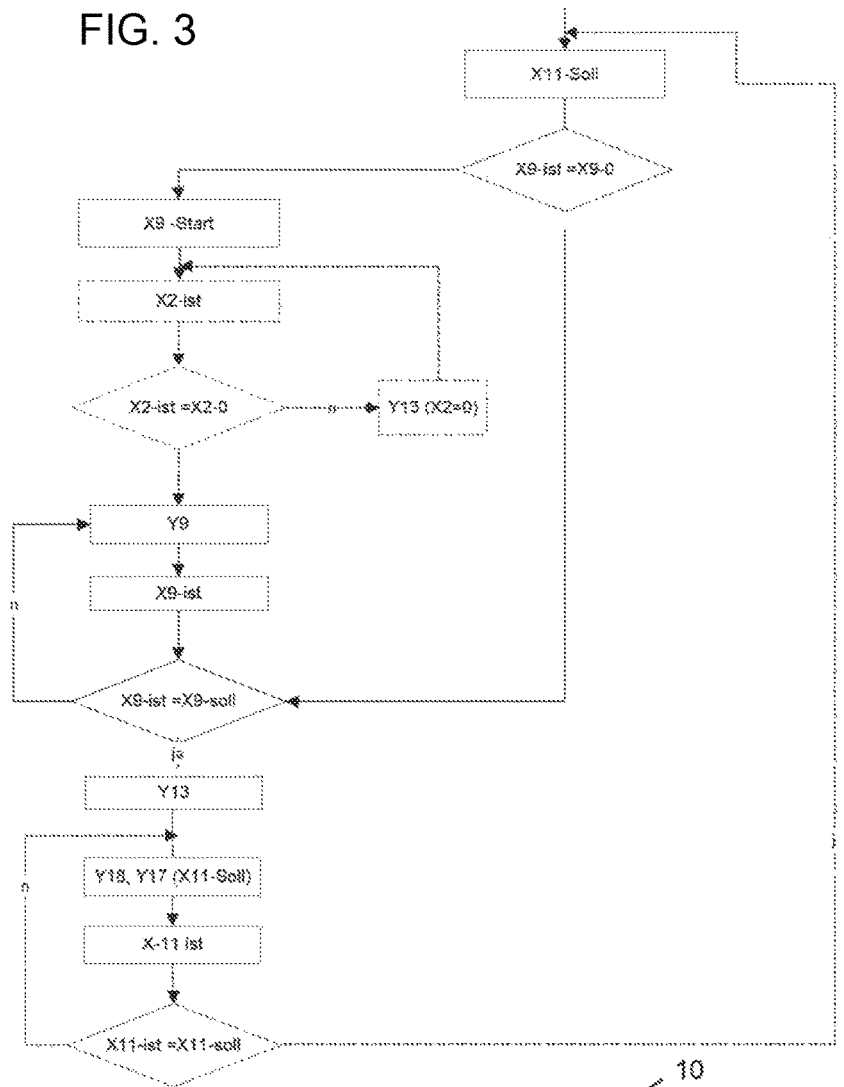
FIG. 3 by means of a flow diagram, the fundamental sequence of a method according to the invention.

According to the invention, it is provided that in both basic designs, the hydrodynamic converter 2 is evacuated on run-up of the drive machine 9, in particular on run-up of the electric motor. The working chamber delimited by the vane wheels is evacuated in a period characterized by the start-up of the drive machine 9 until reaching a predefined rotation speed of the drive machine 9, preferably its nominal rotation speed. Because of the high mass inertias and the break-away torque of the working machine 11, a resistance moment is present at the output side, i.e. at output A, whereby this remains stationary. The drive and output, i.e. input E and output A, are decoupled from each other. The drive machine 9 need merely accelerate the first element of the planetary gear mechanism 4 and the pump wheel P coupled to the input. Because of the translation ratio of the planetary gear mechanism with a stationary third element, a resulting rotation speed is set at the turbine wheel T. On reaching a predefined rotation speed of the drive machine 9, in particular the nominal rotation speed, the converter 2 is filled and the output, i.e. output A, is accelerated. The transmission behavior of the converter 2 is controlled for example via the adjustable vanes. The basic method steps of the method according to the invention are shown in FIG. 3 with reference to a flow diagram for controlling a drive train 10 for driving a working machine 11.

To implement the method in the device, the drive train 10 comprises at least one operating medium supply and/or conduction system 12 assigned to the converter 2, a device 13 for influencing the filling state of the converter 2, and a control device 14. The operating medium supply and/or conduction system 12 assigned to the converter 2 may be a separate system allocated solely to the converter 2, which may optionally also perform additional functions, such as for example supplying lubricant to the bearings. Preferably, the operating medium supply and/or guidance system 12 is part of a central supply system for lubricant for the power transmission device 1. The device 13 for influencing the filling state or filling level comprises means for filling/evacuation, preferably in the form of valve devices in the inlet and outlet of the converter 2. The control device 14 may for example be a control device assigned to the power transmission device 1. Also, a control device assigned to the drive train 10 or the entire assembly of drive train 10 and working machine 11 is conceivable.

The basic method is characterized by the following method steps:

running up the electric drive machine 9 from a standstill with evacuated hydrodynamic rotation speed/torque converter 2, 16, 22 up to a predefined value which at least indirectly characterizes the operating mode of the drive machine 9, in particular its rotation speed, simultaneously with reaching the predefined value which at least indirectly characterizes the operation of the drive machine 9, in particular its rotation speed, or with a temporal offset after reaching this, filling the hydrodynamic rotation speed/torque converter and driving the turbine vane wheel, driving the third element of the planetary gear mechanism 4 with a rotation speed which results from a superposition, defined by the planetary gear mechanism 4, of the rotation speed of the first element of the planetary gear mechanism 4 connected to the electric drive machine 9 and the rotation speed of the second element of the planetary gear mechanism 4 which is at least indirectly connected to the turbine wheel T.

If, for example, a predefined power output behavior, in particular predefined rotation speed, is required at a working machine 11, which may be indicated by a nominal value setting X11-nom for a variable at least indirectly characterizing the operating mode of the working machine 11, and if the drive machine 9 is not in operation, i.e. actual value X9-act of a variable at least indirectly characterizing the operating mode of the drive machine 9 corresponds to X9-0 and describes a state "drive machine 9 off", then depending on the design of the converter and its sequence, it may either be necessary to check the filling state or this may not be necessary since the converter 2 is automatically evacuated on shut-down. Therefore the method step for checking in the flow diagram is shown merely by dotted lines. Preferably, in order to guarantee optimal functionality, such a check is recommended. To check the filling state of the converter 2, for example a value X2-act at least indirectly describing a filling state of the converter 2 is detected. If X2-act describes a state in which the working chamber of the converter 2 is filled, this is evacuated. If X2-act corresponds to X2-0, the converter 2 is evacuated. The actuation device 13 of the converter is actuated for evacuation by determining a correcting variable Y13, in particular Y13 (X2=0), for evacuating the converter 2. If the converter 2 is evacuated, then simultaneously with complete evacuation or with a temporal offset, for example by specifying a predefined waiting time of for example a few seconds, the drive machine 9 is brought into operation. This is achieved by corresponding setting, for example via a correcting variable Y9, for a value X9-nom at least indirectly characterizing a desired operating mode of the drive machine 9. This may also be setting of the nominal rotation speed. When this is reached, an actuating signal Y13 is given for filling the converter 2 and controlling the transmission behavior, Y18 (X11-nom) or Y17 (X11-nom) for setting the variable at least indirectly characterizing the operating mode of the working machine 11, and actuation takes place of the device 13 for influencing the filling state of the converter 2, and devices 18 and 17. The converter 2 allows power transmission thereby according to the filling level and vane setting. The rotation speed at the output of the power transmission device 1 is here influenced by the vane setting.

If a value X11-act at least indirectly characterizing the operation of the working machine 11 is to be set by closed-loop control, in addition a constant comparison with the desired nominal value X11-nom is provided, which is set by changing the correcting variable Y18 or Y17 via the converter 2. The closed-loop control is optional and therefore indicated by an interrupted line.

FIGS. 1 to 3 illustrate basic configurations of the drive trains 10 and the method. In order to reduce the resulting very high rotation speeds at the turbine wheel T during the start process of the drive machine 9, in an advantageous extension of the basic method for the second basic configuration according to FIG. 2, it is provided in FIG. 4 to accelerate the output, i.e. the third element of the planetary gear mechanism 4, before switching on the drive machine 9. For this, a device, in particular a first auxiliary drive device 20, is provided for at least indirectly introducing a drive moment into the third element, here the ring gear 5, of the planetary gear mechanism 4, viewed in the force flow direction from the working machine 11 towards the power transmission device 1. The auxiliary drive device 20 may be configured in many ways. Preferably, this is configured as a shaft rotation device or a rotor rotation device.

In the case depicted, the power transmission device 1 comprises a rotation speed/torque conversion device 23, in particular of the form of a spur gear mechanism, arranged downstream of the planetary gear mechanism 4, wherein the output A which can be coupled to the working machine 11 is arranged eccentrically relative to the input E. In other words, the working machine 11 is also arranged eccentrically relative to the input E. The spur gear mechanism here for example comprises a spur gear set with an accelerating translation ratio in the force flow from the third element of the planetary gear mechanism 4 to the working machine 11. The auxiliary drive device 20 is connected to the third element of the planetary gear mechanism 4 via a self-synchronizing shifting clutch 24, in particular an SSS clutch. In the case depicted, the auxiliary drive device 20 is arranged, or the drive moment introduced into the third element of the planetary gear mechanism 4, via the coaxially arranged free shaft end, connected to the third element, of the rotation speed/torque conversion device 23, in particular the spur gear set. This is designated 25. On the presence of a signal for setting a desired predefined operating state of the working machine 11, therefore, the method shown in FIG. 5 is performed, similarly to that described in FIG. 3, wherein some additional method steps take place before start-up of the drive machine 9. Here again, as already explained in regard to FIG. 3, on the presence of a nominal value X11-nom for a predefined power output behavior at a working machine 11, in particular a predefined rotation speed, a check is performed to establish whether the drive machine 9 is already in operation or, from a standstill on the presence of a signal to start up the drive train 10, a check on the filling state of the converter 2, for example by detecting a value X2-act at least indirectly describing the filling state of the converter 2. If X2-act describes a state in which the working chamber of the converter 2 is filled, this is evacuated. The actuation device 13 of the converter is operated by determining a correcting variable Y13, in particular Y2 (X2=0) for evacuating the converter 2. If the converter 2 is evacuated, then simultaneously with the complete evacuation or with a temporal offset, for example by specifying a predefined waiting time (for example a few seconds), while the drive machine 9 is still deactivated, the auxiliary drive device 20 may be activated for at least indirectly introducing a drive moment at the output A of the power transmission device 1. Preferably, the drive moment is introduced at an element coupled directly to the third element of the planetary gear mechanism 4 in order to drive this from the output side. For this, an actuator device of the auxiliary drive device 20 is operated, in that a correcting variable Y20 is determined. The actuation device serves to set the required operating mode of the auxiliary drive device 20 for introduction of the drive moment. The drive takes place up to a predefined value XA-nom at least indirectly describing the operating mode of the third element or output A, preferably a predefined design rotation speed here when the working machine 9 is stationary. When the predefined design value XA-nom is reached, the drive machine 9 is started. The start process preferably takes place not by directly starting the drive machine 9, but via an auxiliary start device 25 assigned to the drive machine 9. In the case where the drive machine 9 is formed as an electric motor, this preferably comprises an electric auxiliary motor 26 and a converter 27 arranged in the connection to the main drive machine 9, via which the drive machine 9 is run up.

By driving the output side and input E, and the associated drive of the ring gear 5 and web 8 with the converter evacuated, a resulting rotation speed is set at the turbine wheel T which however is limited by the rotation speeds of the first and third elements of the planetary gear mechanism 4. When value X9-act at least indirectly characterizing the operating mode of the drive machine 9 becomes equal to X9-nom, in particular the nominal rotation speed, the converter 2 is switched on by setting Y13 and, with increasing power transmission via the converter, the turbine wheel T and hence the element of the planetary gear mechanism 4 connected thereto are accelerated. The power flow is reversed and the output, in particular output A, is increasingly driven by the drive machine 9. The self-synchronizing shifting clutch 24 is decoupled and the working machine 11 is driven by the power transmission device 1.

Figure 4A:
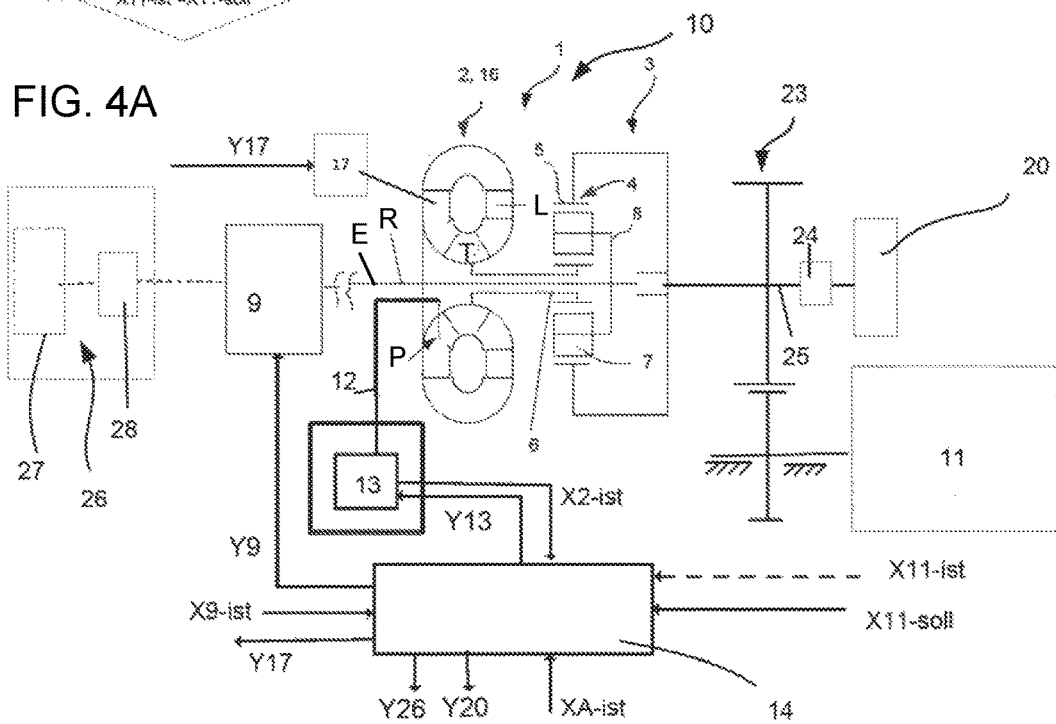
FIG. 4a as an example, the basic structure of a drive train with a power transmission device according to a second, particularly advantageous basic design, for performance of the method according to the invention in a first fundamental extension.
Figure 5A:
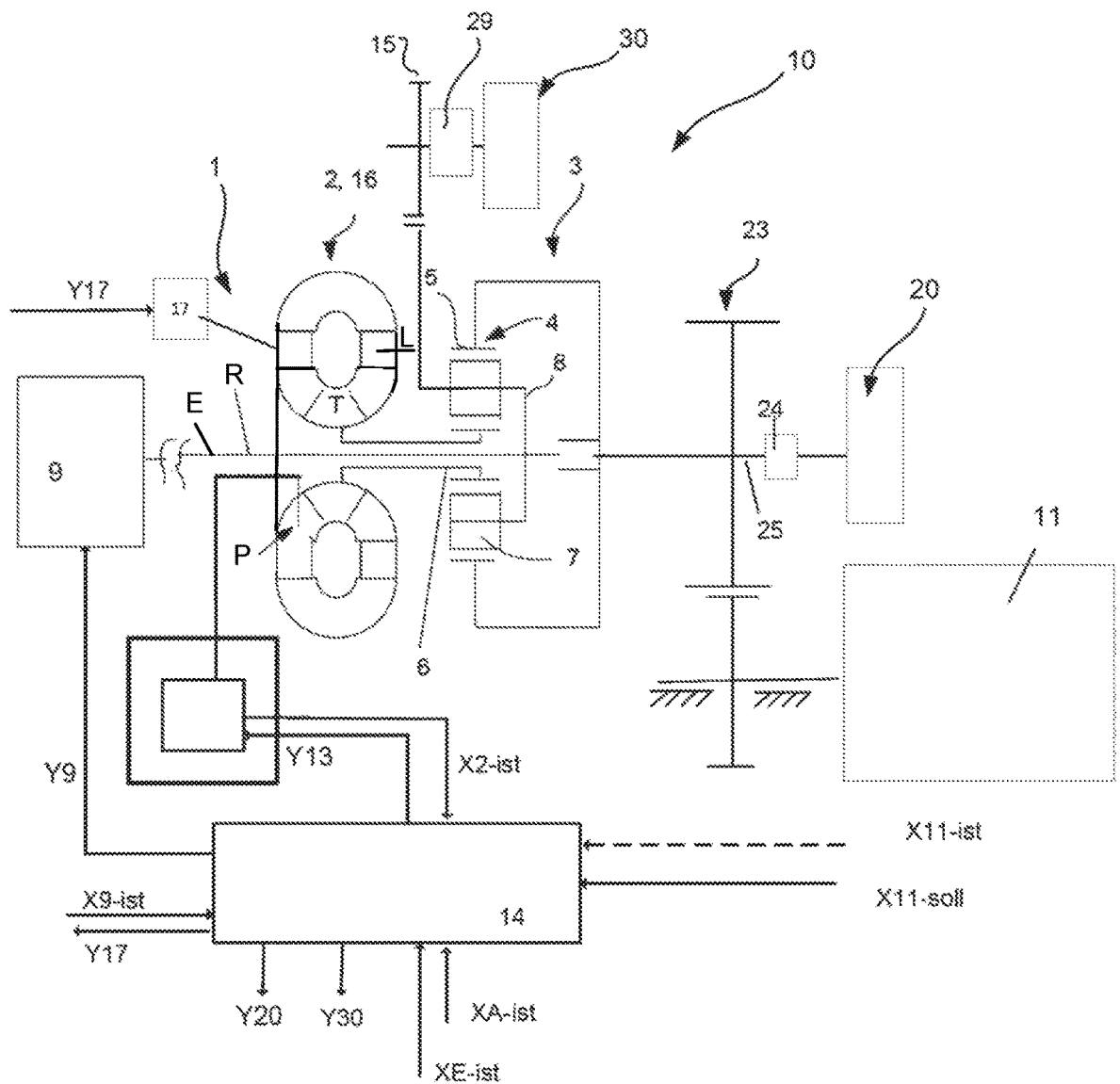
FIG. 5a as an example, the basic structure of a drive train with a power transmission device according to a second, particularly advantageous basic design, for performance of the method according to the invention in a second fundamental extension.
Figure 5B:
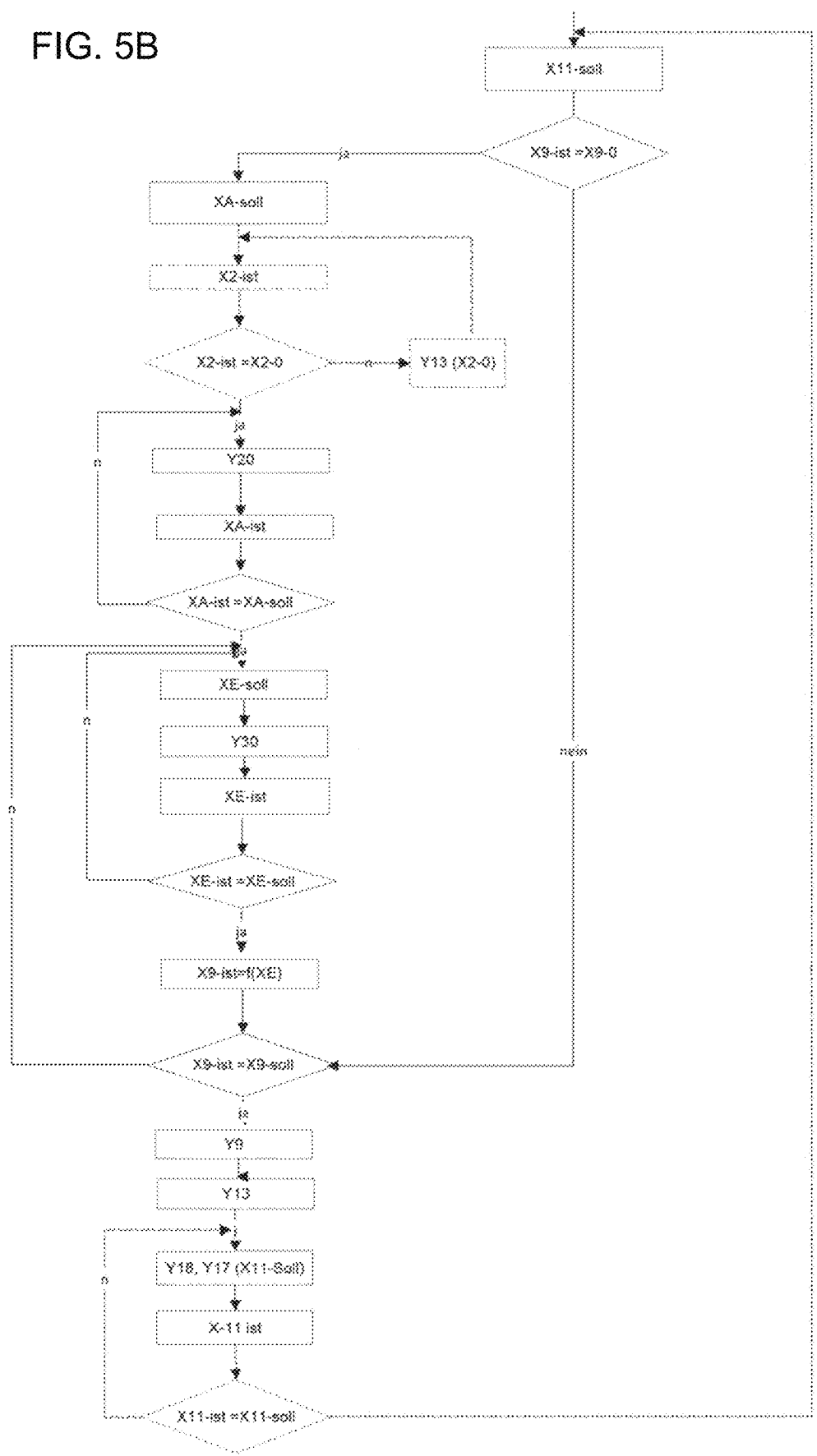
FIG. 5b by means of a flow diagram, the sequence of the method for operating the drive train according to the second extension.

FIG. 5a shows a refinement of a design according to FIG. 4a. FIG. 5b illustrates a second fundamental modification of the method according to the invention and uses method steps according to FIG. 5a.

The design according to FIG. 5a comprises a further auxiliary drive device 30 for introducing a drive moment. This is assigned to the drive shaft, in particular an element connected to the input E. The allocation is preferably made directly to the first element of the planetary gear mechanism 4, here the web 8. This is designed extended on its side facing the converter 2. The web 8 extends in the direction of the converter 2 with free end regions for coupling to the auxiliary drive device 30 for introduction of a drive moment. Here too, coupling preferably takes place via a rotation speed/torque device 15 which is formed by an external toothing of the web 8 and a spur gear in engagement therewith. The auxiliary drive device 30 is coupled to a free shaft end of the spur gear. Here too, coupling takes place preferably via a self-synchronizing shifting clutch 29.

Figure 4B:
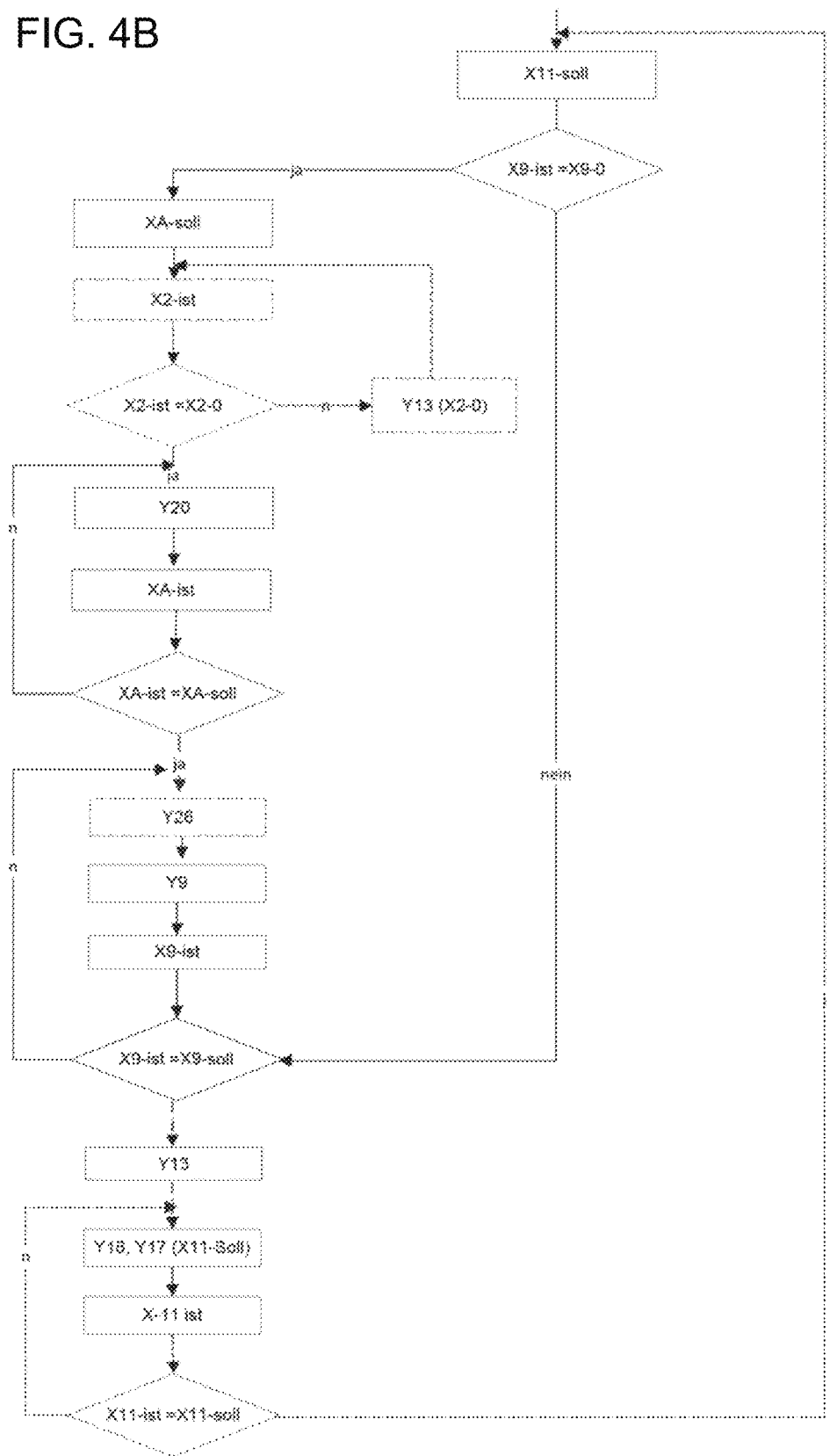
FIG. 4b by means of a flow diagram, the sequence of a method for operating the drive train according to the first extension.

The operating method is structured as shown in FIG. 4b. However, at the same time or with a temporal offset to the drive of the third element, i.e. the ring gear 5 of the planetary gear mechanism 4, the first element of the planetary gear mechanism 4 in the form the planet carrier 8 or web, or the connection between the web and the electric drive machine 9, is driven at least indirectly and preferably directly via a second auxiliary drive device 30 until a nominal rotation speed XE-nom is reached at input E, which preferably corresponds to the nominal rotation speed of the drive machine 9 on direct coupling therewith. If intermediate transmission devices with a translation ratio are provided, these must be taken into account. The drive shaft of the electric drive machine 9 is also driven by its coupling until the network and the electric drive machine 9 are in synchrony, wherein in synchronized state, the electric drive machine 9 is connected to a network.

The formation of the auxiliary drive devices 20 and 30 as rotor rotation devices, and the devices for decoupling/coupling to the respective elements of the planetary gear mechanism in the form of SSS clutches, constitute particularly advantageous embodiments. The solution according to the invention is not however restricted thereto. It is also conceivable to use other auxiliary drive devices, such as for example electric drive machines, hydrostatic drives etc.

It is also possible to replace the SSS clutches with switchable clutch devices which however must be actuated accordingly.

Figures 6A, 6B:
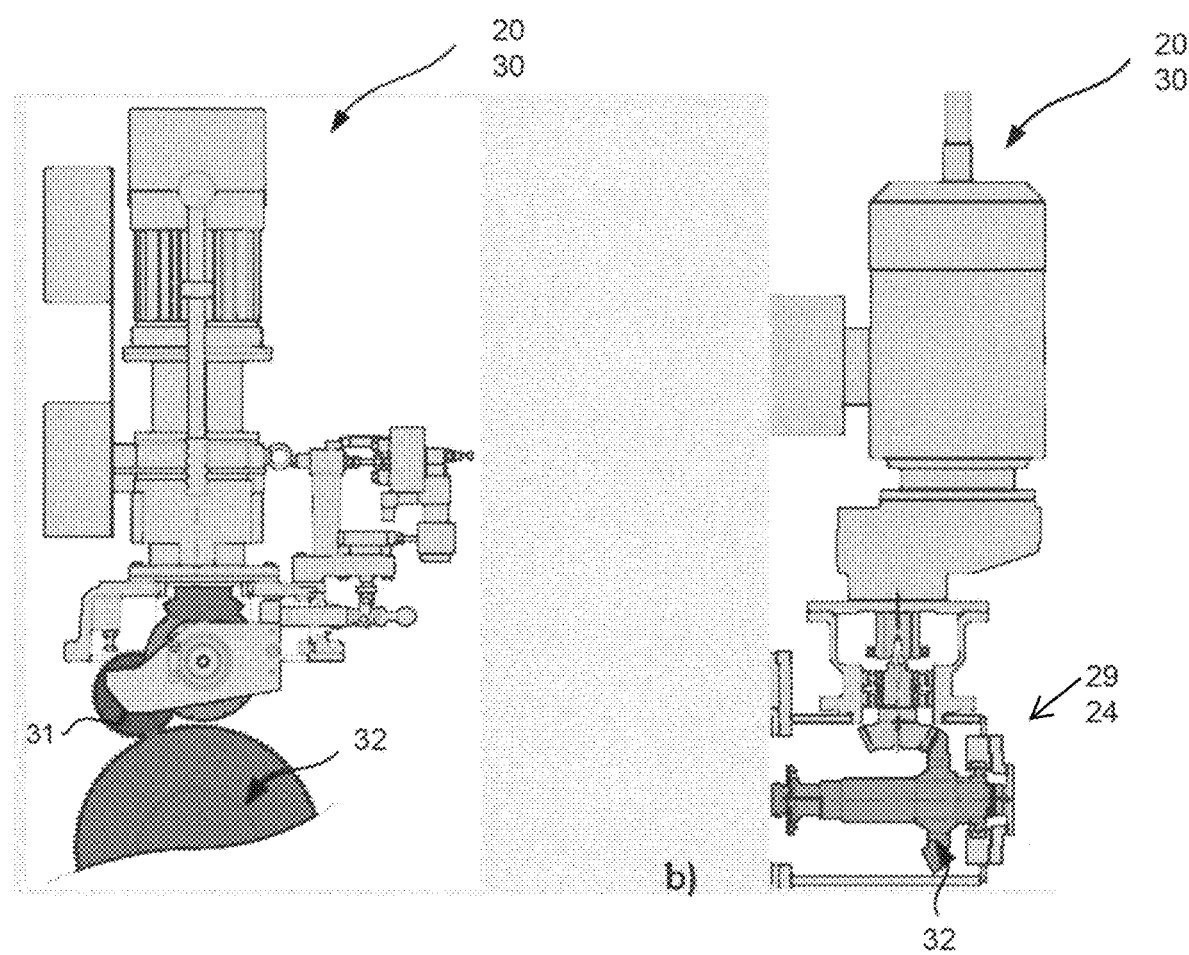
FIG. 6a as an example, the possible configuration of a first or second auxiliary drive device in the form of a rotor rotation device with swiveling pinion.
FIG. 6b as an example, the possible configuration of the first or second auxiliary drive device in the form of a rotor rotation device with SSS clutch.

Furthermore, the auxiliary drive devices 20 and/or 30 may be configured as rotor rotation devices with swiveling pinion, as shown for example in FIG. 6*a*. In this case, decoupling/coupling takes place via the swiveling of the swiveling pinion 31. This is connected to a pinion 32 in the coupled position. When the auxiliary drive device 20 is configured as a rotor rotation device with swiveling pinion, the pinion 32 is here arranged in the connection between the working machine 11 and the third element of the planetary gear mechanism 4, or at an extended end of the third element. When the auxiliary drive device 30 is configured as a rotor rotation device with swiveling pinion, the pinion 32 is arranged in the connection between the first element of the planetary gear mechanism 4 and the drive machine 9, or at an element connected to the first element. The pinion 32 may be driven for example electrically or electro-hydraulically. The swiveling is controlled.

FIG. 6*b* shows as an example the possible configuration of the first and/or second auxiliary drive device 20/30 in the form of the rotor rotation device with SSS clutch 24 or 29. Here again, this comprises a pinion 32 in engagement with a gearwheel or pinion 31 in the drive train. The coupling/decoupling in the sense of a torque-transmitting connection however takes place via the SSS clutch 24 or 29.

For the formation of the rotor rotation device, known systems may be used. With regard to possible embodiments, reference may be made for example to EP2161416B1; U.S. Pat. No. 3,960,028A; DE7404122U.

LIST OF REFERENCE SIGNS

1 Power transmission device
2 Hydrodynamic rotation speed/torque converter
3 Superposition gear mechanism
4 Planetary gear mechanism
5 Ring gear
6 Sun wheel
7 Planet wheels
8 Web, planet carrier
9 Drive machine, in particular electric motor
10 Drive train
11 Working machine
12 Operating medium supply/conduction system
13 Filling and evacuation device
14 Control device
15 Rotation speed/torque conversion device
16 Reverse rotation converter
17 Actuator device
18 Actuator device
19
20 First auxiliary drive device, in particular rotor rotation device
21 Reversing stage
22 Synchronous rotation converter
23 Rotation speed/torque conversion device, in particular spur gear stage
24 Self-synchronizing shifting clutch
25 Free shaft end
26 Auxiliary start device
27 Auxiliary motor
28 Converter
29 Self-synchronizing shifting clutch
30 Second auxiliary drive device, in particular rotor rotation device
31 Pinion
32 Pinion
A Output, output shaft
E Input, input shaft
P Pump wheel (converter)
T Turbine wheel (converter)
L Guide wheel

The invention claimed is:

1. A method for operating a drive train for driving a working machine with variable rotation speed, the drive train having an electric drive machine operable at a constant rotation speed and a power transmission device,
   wherein the power transmission device containing:
      an input for at least indirect connection to the electric drive machine;
      an output for at least indirect connection to the working machine;
      a hydrodynamic rotation speed/torque converter containing vane wheels including at least a pump vane wheel, a turbine vane wheel and a guide wheel, and form a working chamber that can be filled with and operating medium;
      a superposition gear mechanism with at least one planetary gear mechanism having a ring gear, a sun wheel and a planet carrier with several planet wheels as elements of the planetary gear mechanism;
      the input of the power transmission device is connected at least indirectly to the pump wheel of the hydrodynamic rotation speed/torque converter and to a first element of the planetary gear mechanism;
      the turbine van wheel of the hydrodynamic rotation speed/torque converter is connected at least indirectly to a second element of the planetary gear mechanism; and
      a third element of the planetary gear mechanism is connected at least indirectly to or forms the output of the power transmission device;
      an operating medium supply and/or guidance system assigned at least to the hydrodynamic rotation speed/torque converter; and
      a device for influencing a filling state of the hydrodynamic rotation speed/torque converter;
   the method which comprises the following steps of:
      running up the electric drive machine from a standstill, with the hydrodynamic rotation speed/torque converter evacuated, to a predefined value which at least indirectly characterizes an operating mode of the electric drive machine;
      simultaneously with reaching the predefined value which at least indirectly characterizes the operating mode of the electric drive machine or with a temporal offset after reaching the predefined value, filling the hydrodynamic rotation speed/torque converter and driving the turbine wheel; and
      driving the third element of the planetary gear mechanism with a rotation speed which results from a superposition, defined by the planetary gear mechanism, of a rotation speed of the first element of the planetary gear mechanism connected to the electric drive machine and a rotation speed of the second element of the planetary gear mechanism which is at least indirectly connected to the turbine wheel.

2. The method according to claim 1, wherein at least one of the vane wheels of the hydrodynamic rotation speed/torque converter contains adjustable vanes or adjustable vane segments, and a transmission behavior of the hydrodynamic rotation speed/torque converter can be set by adjusting at least the adjustable vanes or the adjustable vane segments on at least one of the vane wheels namely the pump vane wheel, the turbine vane wheel or the guide wheel.

3. The method according to claim 1, wherein the hydrodynamic rotation speed/torque converter is evacuated on a presence of at least one of a plurality of events listed below:
on or after termination of a run-down/shut-down of the drive train;
detection of the filling state before or on start-up after shut-down of the drive train; or
detection of the filling state when a predefined nominal value is present for setting a predefined operating mode of the working machine on stoppage of the electric drive machine or the drive train.

4. The method according to claim 1, wherein:
with the electric drive machine stopped and the hydrodynamic rotation speed/torque converter evacuated, driving the third element of the planetary gear mechanism at least indirectly via a first auxiliary drive device;
simultaneously with this or with a temporal offset from the setting of a predefined rotation speed of the third element of the planetary gear mechanism, the electric drive machine is run up; and
on reversal of a force flow to the third element of the planetary gear mechanism by driving of the second element of the planetary gear mechanism by the turbine wheel when the hydrodynamic rotation speed/torque converter is filled, the first auxiliary drive device is decoupled from the third element of the planetary gear mechanism.

5. The method according to claim 4, which further comprises running the electric drive machine by means of an auxiliary start device.

6. The method according to claim 1, wherein:
with the electric drive machine stopped and the hydrodynamic rotation speed/torque converter evacuated, driving the third element of the planetary gear mechanism at least indirectly via a first auxiliary drive device;
simultaneously or with a temporal offset from driving of the third element of the planetary gear mechanism, the first element of the planetary gear mechanism or a connection of the first element of the planetary gear mechanism to the electric drive machine is driven at least indirectly via a second auxiliary drive device;
the electric drive machine is driven via a drive of the first element of the planetary gear mechanism or a connection of the first element of the planetary gear mechanism to the electric drive machine until a network and the electrical drive machine are in synchrony, and in a synchronous state the electric drive machine is connected to the network.

7. The method according to claim 4, wherein at a time of driving of the third element of the planetary gear mechanism with a superposition rotation speed, which is defined by the planetary gear mechanism from the rotation speed of the first element of the planetary gear mechanism connected to the electric drive machine and the rotation speed of the second element of the planetary gear mechanism connected at least indirectly to the turbine van wheel, the drive of the first auxiliary drive device is deactivated or decoupled from the third element.

8. The method according to claim 7, wherein the first auxiliary drive device is coupled at least indirectly to the third element of the planetary gear mechanism via a self-synchronizing shifting clutch, wherein the self-synchronizing shifting clutch is configured and disposed so as to decouple the first auxiliary device from the third element automatically on reversal of a power flow to the third element of the planetary gear mechanism.

9. The method according to claim 6, wherein on driving of the first element via the electric drive machine, the second auxiliary drive device is deactivated or decoupled from the first element of the planetary gear mechanism or from the connection between the electric drive machine and the first element of the planetary gear mechanism.

10. The method according to claim 9, wherein the second auxiliary drive device is coupled at least indirectly to the first element of the planetary gear mechanism via a self-synchronizing shifting clutch, wherein the self-synchronizing shifting clutch is configured and disposed so as to decouple the second auxiliary device from the first element automatically on reversal of a power flow to the first element.

11. The method according to claim 1, which further comprises connecting mechanically the electric drive machine to the first element of the planetary gear mechanism.

12. The method according to claim 1, wherein the hydrodynamic rotation speed/torque converter is formed as a reverse rotation converter, and the first element of the planetary gear mechanism is formed by the planet carrier, the second element by the sun wheel, and the third element by the ring gear.

13. A drive train for driving a working machine with variable rotation speed, the drive train comprising:
an electric drive machine which can be operated at a constant rotation speed;
a power transmission device, containing:
an input for at least indirect connection to said electric drive machine;
an output for at least indirect connection to the working machine;
a hydrodynamic rotation speed/torque converter containing vane wheels including at least a pump vane wheel, a turbine vane wheel and a guide wheel, which form a working chamber that can be filled with an operating medium;
a superposition gear mechanism with at least one planetary gear mechanism having a ring gear, a sun wheel, and a planet carrier with several planet wheels as elements of said planetary gear mechanism;
said input of said power transmission device is connected at least indirectly to said pump vane wheel of said hydrodynamic rotation speed/torque converter and to a first element of said elements of said planetary gear mechanism;
said turbine vane wheel of said hydrodynamic rotation speed/torque converter is connected at least indirectly to a second element of said elements of said planetary gear mechanism;
a third element of said elements of said planetary gear mechanism is connected at least indirectly to or forms said output of said power transmission device;
detection devices for detecting at least one of the following variables:
a variable at least indirectly describing an actual value of an operating mode of said electric working machine; and
a variable at least indirectly describing an actual value of a filling state of said hydrodynamic rotation speed/torque converter;
devices for influencing the filling state of said hydrodynamic rotation speed/torque converter;

actuation devices for operating said devices for influencing the filling state of said hydrodynamic rotation speed/torque converter; and a control device coupled communicatively with said detection devices and said actuation devices.

14. The drive train according to claim 13, wherein said vane wheels have vanes and at least said vanes of one of said vane wheels of said hydrodynamic rotation speed/torque converter contains at least one adjustable vane which can be actuated via an adjustment device, and/or at least one multi-member vane with at least one adjustable vane segment.

15. The drive train according to claim 13, wherein said hydrodynamic rotation speed/torque converter is configured as a reverse rotation converter, and said first element of said planetary gear mechanism is formed by said planet carrier of said planetary gear mechanism, said second element by said sun wheel of said planetary gear mechanism, and said third element by said ring gear of said planetary gear mechanism.

16. The drive train according to claim 15,
further comprising a hollow shaft with an input shaft running through said hollow shaft; and
wherein said turbine wheel is connected to said sun wheel via said hollow shaft, and said input shaft running through said hollow shaft is connected to said planet carrier on a side of said planetary gear mechanism facing away from said hydrodynamic rotation speed/torque converter.

17. The drive train according to claim 13, wherein:
said hydrodynamic rotation speed/torque converter is configured as a synchronous rotation converter;
alternatively one of the following possibilities applies for coupling to said superposition gear mechanism:
a) said first element of said planetary gear mechanism is formed by said ring gear, said second element of said planetary gear mechanism by said planet carrier, and said third element of said planetary gear mechanism by said sun wheel, and said turbine wheel is connected to said planet carrier either directly or via a reversing gear mechanism;
b) said first element of said planetary gear mechanism is formed by said ring gear, said second element of said planetary gear mechanism by said sun wheel, and said third element of said planetary gear mechanism by said planet carrier;
c) said first element of said planetary gear mechanism is formed by said sun wheel, said second element of said planetary gear mechanism by said ring gear, and said third element of said planetary gear mechanism by said planet carrier;
d) said first element of said planetary gear mechanism is formed by said sun wheel, said second element of said planetary gear mechanism by said planet carrier, and said third element of said planetary gear mechanism by said ring gear; and
e) said first element of said planetary gear mechanism is formed by said planet carrier, said second element of said planetary gear mechanism by said ring gear, and said third element of said planetary gear mechanism by said sun wheel.

18. The drive train according to claim 13, further comprising a first auxiliary drive device for at least indirectly introducing a drive moment into said third element of said planetary gear mechanism.

19. The drive train according to claim 18, wherein said first auxiliary drive device is disposed and configured such that the drive moment is supplied to said third element of said planetary gear mechanism according to at least one of the following possibilities:
introduction of the drive moment directly into said third element of said planetary gear mechanism;
introduction of the drive moment into a connection between said third element of said planetary gear mechanism and said output of said power transmission device;
introduction of the drive moment at said output of said power transmission device;
introduction of the drive moment into a connection between said output of said power transmission device and said working machine; and
introduction of the drive moment into a rotation speed/torque conversion device connected to said third element or to a connection between said third element of said planetary gear mechanism and said output or to a connection between said output and the working machine.

20. The drive train according to claim 18,
further comprising a rotation speed/torque conversion device disposed downstream of said planetary gear mechanism in a force flow between this and the working machine, said rotation speed/torque conversion device having a free shaft end facing away from said planetary gear mechanism and an output disposed eccentrically relative to said planetary gear mechanism; and
wherein said first auxiliary drive device is disposed at said free shaft end of said rotation speed/torque conversion device facing away from said planetary gear mechanism.

21. The drive train according to claim 18, further comprising a second auxiliary drive device for at least indirectly introducing a drive moment into said first element of said planetary gear mechanism.

22. The drive train according to claim 21, wherein said second auxiliary drive device is disposed and configured such that the drive moment is supplied to said first element of said planetary gear mechanism according to at least one of the following possibilities:
introduction of the drive moment directly into said first element of said planetary gear mechanism; and
introduction of the drive moment into a connection between said first element of said planetary gear mechanism and said input of said power transmission device.

23. The drive train according to claim 21, wherein said first auxiliary drive device and/or said second auxiliary drive device can be decoupled from the drive train.

24. The drive train according to claim 23, wherein said first auxiliary drive device and/or said second auxiliary drive device is connected to the drive train.

25. The drive train according to claim 21, wherein said first auxiliary drive device and/or said second auxiliary drive device is configured as a device selected from the group consisting of:
a shaft rotation device; and
a drive machine.

26. The drive train according to claim 13, further comprising an auxiliary start device assigned to said electric drive machine for run up, said auxiliary start device having:
an electric auxiliary motor and a converter; or
an electric auxiliary motor and a frequency converter.

27. The drive train according to claim 13, wherein said control device is coupled communicatively with further detection devices for detecting an actual state of a variable at least indirectly characterizing the operating mode of the working machine, and to adjustment devices of auxiliary drive machines.

\* \* \* \* \*